July 11, 1933.  L. A. DEMKIER ET AL  1,917,507
CHANGE SPEED GEAR BOX
Filed April 6, 1931   2 Sheets-Sheet 1

Inventors:
Lester A. Demkier
Donald L. Meyers
By Wilson, Dawell, McCanna & Rehm
Attys.

July 11, 1933. L. A. DEMKIER ET AL 1,917,507
CHANGE SPEED GEAR BOX
Filed April 6, 1931 2 Sheets-Sheet 2
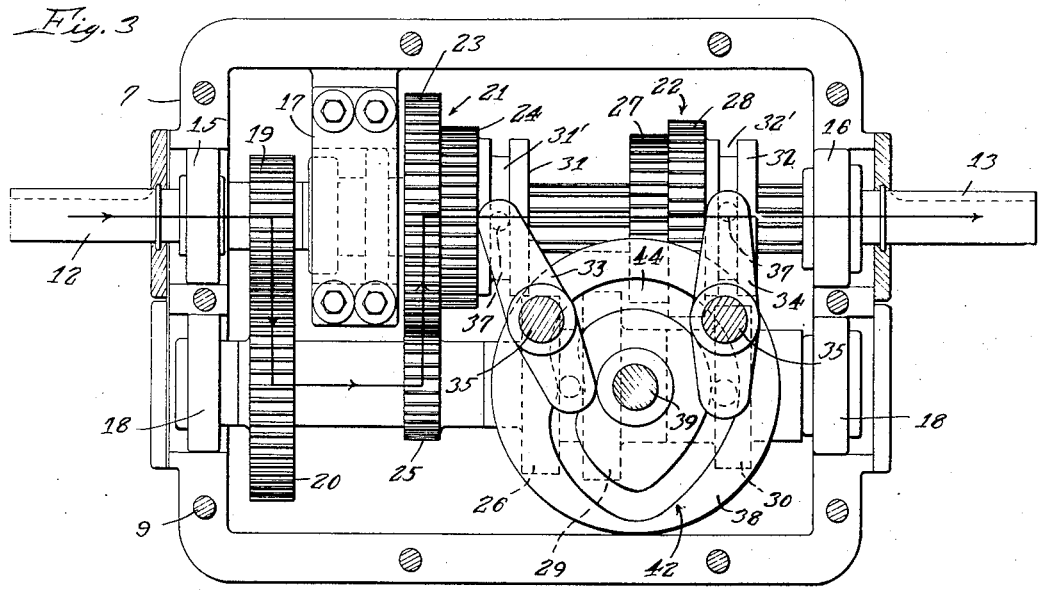
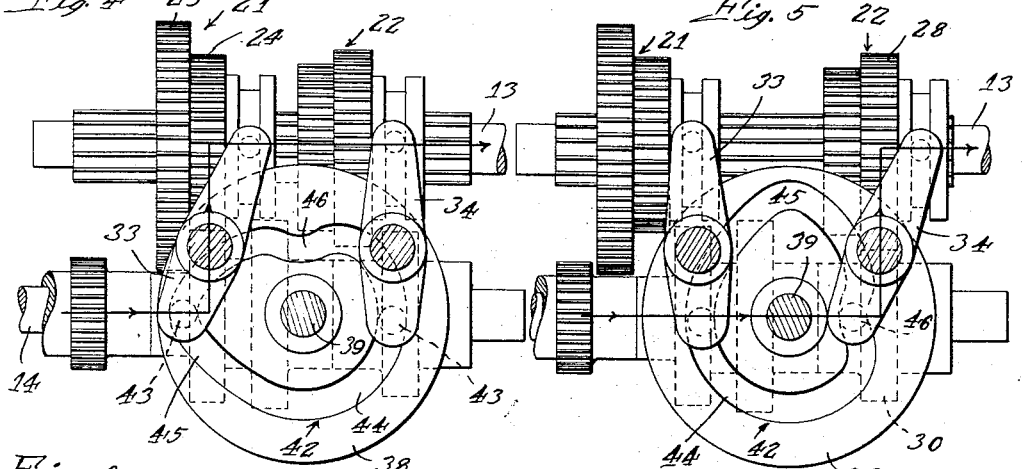
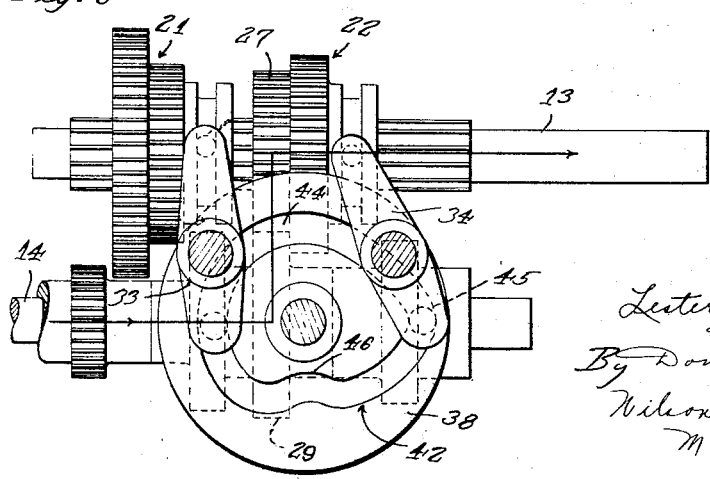

Patented July 11, 1933

1,917,507

UNITED STATES PATENT OFFICE

LESTER A. DEMKIER AND DONALD L. MEYERS, OF DUBUQUE, IOWA, ASSIGNORS TO THE ADAMS COMPANY, OF DUBUQUE, IOWA, A CORPORATION OF IOWA

CHANGE SPEED GEAR BOX

Application filed April 6, 1931. Serial No. 527,947.

This invention relates to change speed gear boxes and has special reference to one in which the operation of a single lever makes the different speeds available through sliding gears. Gear boxes of this type, while adapted for use wherever multiple speed changes are desired, are particularly adapted for use in converting belt driven machines to direct motor drive where the machines require speed variation from a constant speed motor.

The principal object of our invention is to provide a single rotary cam disc operable by the hand lever to different positions for different speeds and having a single cam groove on one face thereof cooperating with two shift levers pivotally mounted in the housing for oscillation and having direct operating connections with the slidable gears. This novel combination and arrangement of parts enables, by its compactness, the reduction in the size of the gear box down to a size hardly more than just large enough to accommodate the gears, thus permitting it to be installed in many instances where other larger boxes would be entirely unsuited or, at least, could not be used to as good advantage.

The invention is fully described hereinafter by reference to the accompanying drawings, in which—

Fig. 3 is a horizontal section taken on the line 3—3 of Fig. 2, with the cover removed, and Figs. 4-6 are fragmentary views similar to Fig. 3 showing the positions of the parts for three other speeds.

The same reference numerals are applied to corresponding parts throughout the views.

The gear box comprises a housing made up of two parts, namely, a bottom portion 7 and a top or cover portion 8 arranged to be bolted in place, as indicated at 9, the pads 10 on the bottom portion of the housing providing means whereby the gear box may be bolted to the floor or onto any suitable support in proper relation to the electric motor or other prime mover used as the source of power and the machine to be driven thereby through the gear box. At 11 is indicated a suitable means for filling the housing with oil to the proper level for lubrication of the gearing therein and the shift mechanism employed in connection therewith in accordance with our invention.

Figure 2:
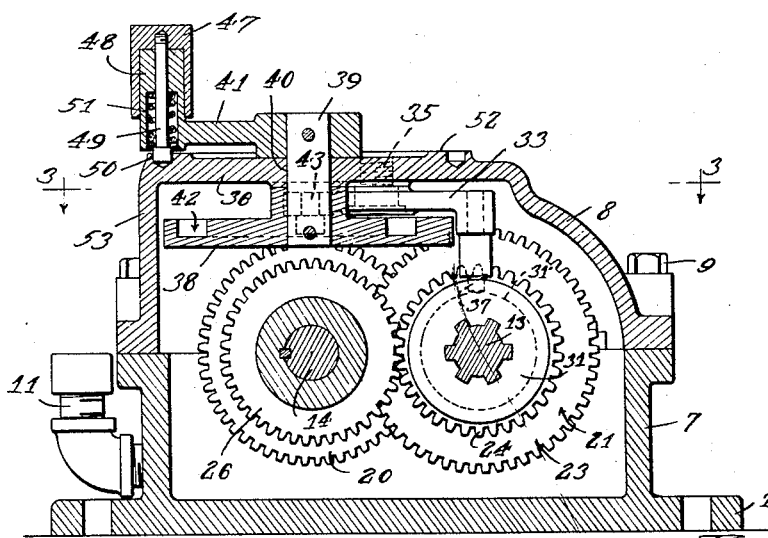
Fig. 2 is a cross-section in the plane of the line 2—2 of Fig. 1 but with the hand lever turned into the plane of the section.

The slidable gear transmission employed is of the conventional type having the input and output shafts 12 and 13, preferably coaxially arranged and a counter shaft 14 disposed parallel therewith. A bearing 15 is provided in the wall of the housing for the input shaft 12 and a similar bearing is provided for the output shaft at 16, and at 17 are two bearings for the inner ends of the shafts 12 and 13 inside the housing. Two bearings 18 are provided at opposite ends of the housing for the countershaft 14. Gears 19 and 20 provide an initial speed reduction between the shafts 12 and 14 and while ordinary spur gears are shown it should be understood that helical gears might be used for smoother operation, and if a greater reduction is desired a worm and gear could be substituted for the gears 19 and 20, respectively. Two gear clusters 21 and 22 are splined on the shaft 13 so as to be slidable to and fro, whereby to mesh either of the gears 23 and 24 of the cluster 21 with their companion gears 25 and 26, respectively, on the counter shaft or to mesh either of the gears 27 and 28 of the cluster 22 with their companion gears 29 and 30, respectively, also mounted on the counter shaft. The gears 25, 26, 29 and 30 are all keyed on the counter shaft as appears in Fig. 2 in fixed positions. The lowest or first speed is secured as in Fig. 3 when the gear 23 is meshed with the gear 25. The next or second speed is secured as in Fig. 4 when the gear 24 is meshed with gear 26. The next or third speed, as in Fig. 5, is secured when gear 28 is meshed with gear 30, and the highest or fourth speed is secured, as in Fig. 6, when the gear 27 is meshed with gear 29. In other words, two speeds are secured with each of the gear clusters 21 and 22 and while the one cluster is in either of its operative positions the other cluster is in a disengaged neutral position.

The shifting mechanism employed in connection with the gear clusters 21 and 22 for shifting the same selectively to the different positions shown in Figs. 3-6 will now be described. The clusters 21 and 22 have hubs 31 and 32, respectively, formed suitably integral therewith, and annular grooves are provided in these hubs, as appears at 31′ and 32′, respectively. Two shift levers 33 and 34 are pivotally mounted on studs 35 depending from the flat top portion 36 of the cover 8 of the housing. A pin 37 projects downwardly from the one end of each of the two shift levers, the lever 33 having its pin entered directly in the groove 31′ and the lever 34 having its pin entered directly in the groove 32′. This enables the shifting of the cluster 21 back and forth between the positions shown in Figs. 3 and 4 by oscillation of the lever 33 or the holding of said cluster in the neutral position shown in Figs. 5 and 6. In a similar manner the cluster 22 is shiftable by the lever 34 back and forth between the positions shown in Figs. 5 and 6 and is arranged to be held in neutral position, as indicated in Figs. 3 and 4. Each of the levers is, therefore, arranged to occupy either one of three different positions. The single rotary cam disc 38 provided in accordance with our invention is disposed in the housing in a plane parallel with the plane of oscillation of the levers and immediately below the same, as appears in Fig. 2, said disc being carried on a short shaft 39 extended through a hole 40 at the center of the flat top portion 36 of the cover. A handle 41 is fastened on the projecting end of said shaft for turning the same and thereby turn the disc. Now, a single continuous cam groove 42 is provided in the upper face of the disc 38, and pins 43 projecting downwardly from the other ends of the shift levers 33 and 34 are received in this groove at diametrically opposite sides of the disc. The portion 44 of the groove 42 is concentric with the disc 38 and shaft 39 and when either of the pins 43 is riding in this portion of the groove the shift lever associated therewith holds the associated gear cluster in neutral position throughout approximately 180° of movement of the disc. Thus, the lever 34 is illustrated as holding the cluster 22 in neutral position in Figs. 3 and 4, which show the disc 38 in two positions, a quarter of a turn of the disc apart, and the lever 33 is shown as holding the cluster 21 in neutral position in Figs. 5 and 6, which show the disc in two other positions also a quarter of a turn of the disc apart. Two profiled cam-shaped portions 45 and 46 are provided in the other two quadrants of the groove 42, the portion 45 in one quadrant departing from the concentric portion 44 outwardly and the portion 46 in the other quadrant inwardly with respect to the axis 39 of rotation, whereby to communicate movement to a lever in one direction from neutral position at the portion 45 and in the other direction at the portion 46 in the turning of the disc. From this description of the continuous groove 42 it must appear that while the one lever 34 is tracking the concentric half of the groove the other lever is tracking the profiled half of the groove, and one can select either of two speeds with the one lever by turning of the disc to either of two positions without disturbing the position of the other lever. The one lever, in other words, shifts the one cluster either way from neutral position while the other lever is holding the cluster associated therewith in neutral position. Since the groove 42 is continuous and the levers 33 and 34 are associated therewith and with the gear clusters 21 and 22 in the manner stated it must be evident that the disc 38 can be turned in either direction by means of the lever 41. That is of advantage because it avoids the necessity of moving the lever through the intermediate positions if it is desired to step from one extreme speed to the other and back again, or from any higher speed back to a lower speed, and vice versa. As a matter of indicating to the operator when the lever 41 is in the proper position for a given speed, and also as a means of holding the lever in that position, we have provided a knob 47 slidably mounted on an upwardly projecting boss 48 on the outer end of the handle 41 and having a detent pin 49 projecting downwardly through the boss and arranged to be entered selectively in either one of four holes 50 provided in the top of the flat portion 36 of the cover in equally circumferentially spaced relation. A coiled compression spring 51 is provided in a socket formed in the bottom of the boss 48 and serves to normally urge the pin 49 downwardly toward the cover. A flat circular track 52 is formed on the portion 36 of the cover concentric with the hole 40 on which the lower end of the pin 49 is arranged to ride in the travel of the handle 41 from one position to the next. When the handle arrives at the proper position the pin drops into the hole with a click and the operator is thereby informed of the engagement of the gears for that speed, and, of course, the gears are held in such engagement until the knob 47 is raised and the handle turned.

Figure 1:
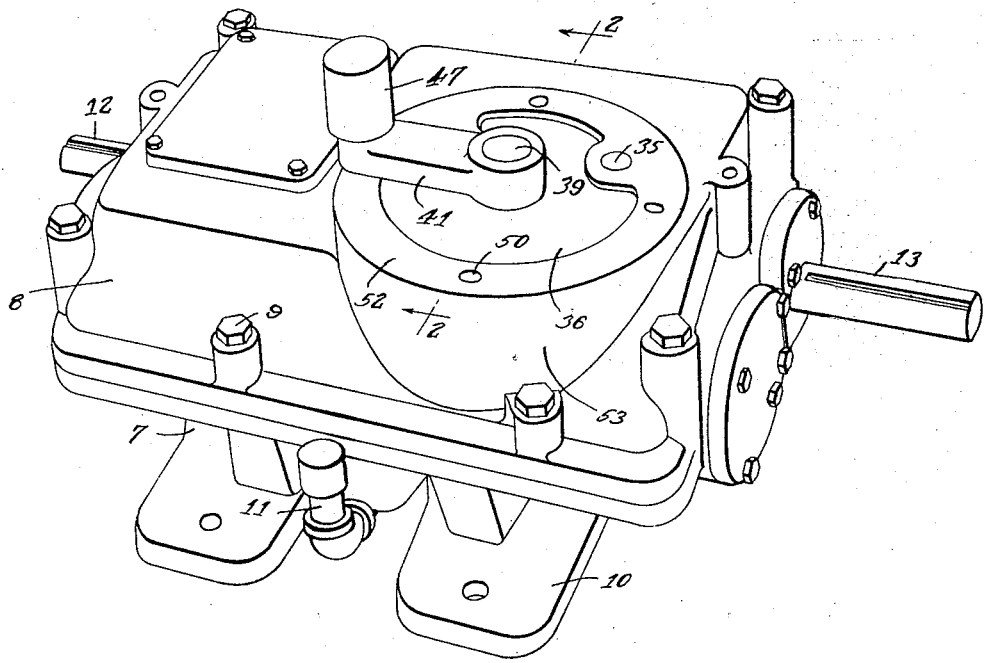
Figure 1 is a perspective view of a change speed gear box made in accordance with our invention.

The operation of the gear box is thought to be clear from the foregoing description. The electric motor or other power means is coupled with the input shaft 12, and the machine to be driven, such as a machine tool, is suitably connected with the output shaft 13, the gear box being mounted so as to leave the lever 41 easily accessible for manipulation for selecting the speeds. If desired, the flat top portion 36 of the cover may be marked adjacent the four holes 50 in any suitable way to indicate the speeds obtainable when the lever 41 is moved to the different positions. In conclusion, it will be observed in Figs. 1 and 2 that the gear shifting mechanism of our invention, by reason of its compactness, enables the reduction of the housing of the gear box to a size hardly more than just large enough to accommodate the gears themselves, the cover 8 being embossed only to the slight extent indicated at 53 to provide a circular recess therein to accommodate the disc and levers forming a part of the shifting mechanism inside the housing. This compactness of the mechanism is obviously due to the fact that the shift levers 33 and 34 have direct operating connection with the gear clusters 21 and 22 at one end and at the other end have direct connection with the single disc 38 in the same continuous cam groove, and the compactness of the general assembly is due to the fact that the disc is disposed substantially in parallelism with the plane of the shafts 13 and 14 carrying the change-speed gearing. Manifestly, if the levers were not disposed on the same side of the disc it would be impossible to arrive at such compactness. Then, too, of course, the mechanism is reduced to the ultimate simplicity by having the lever 41 directly connected with the disc 38 in the manner shown. There is also quite an advantage in having the shifting mechanism in a unitary assembly on the cover and removable therewith from the gear box.

Various changes may be made in the gear box without seriously departing from our invention. For that reason, the appended claims have been drawn to cover all legitimate modifications and adaptations.

We claim:

1. Cam means for shifting gears in a change speed gear box for machine tools and the like, comprising a single rotary disc in the box, a stub shaft for turning the same projecting through a removable cover on said box, said disc being constructed to constitute a single cam, shifters mounted on the cover in a predetermined relation to the disc and arranged in the turning thereof to be cammed to shift the respective gears to be shifted in a predetermined manner, said shifters having detachable operating connections with said gears to permit removal thereof with said cover, and means outside the cover for turning said shaft.

2. Cam means for shifting gears in a change speed gear box comprising a single rotatable disc in said box in close proximity with the shiftable gears and in slightly spaced relation to a wall of the box, a plurality of shift levers all disposed between the disc and the wall and pivoted to the latter intermediate their ends within the circle described by the disc, said cam having a single cam groove therein, said levers having projections on their inner ends all tracking the one groove, the outer ends of said levers reaching outside the circle described by the disc and having projections for direct operative connection with the respective gears whereby the turning of the disc shifts the respective gears, and means for turning said disc.

3. Cam means for shifting gears in a change speed gear box for machine tools and the like comprising a single rotary circular cam disc having a single endless cam groove of a predetermined profile provided in one face thereof, a pair of oscillating shifters, of short length in comparison to the radius of the disc, said shifters being pivotally supported intermediate their ends next to the grooved face of the disc at points equally spaced to either side of the disc center and within the circle described by the disc, projections on the inner ends of said shifters entered in said groove at points on diametrically opposite sides of the disc center, the outer ends of said shifters projecting beyond the periphery of the disc for operation of members to be shifted, and means providing direct connections between the outer ends of said shifters and said members.

In witness of the foregoing we hereby affix our signatures.

LESTER A. DEMKIER.
DONALD L. MEYERS.